United States Patent [19]
Ge et al.

[11] Patent Number: 5,402,143
[45] Date of Patent: Mar. 28, 1995

[54] COLOR FLUORESCENT LIQUID CRYSTAL DISPLAY

[75] Inventors: Shichao Ge, Santa Clara; Jemm Liang, San Jose, both of Calif.

[73] Assignee: Panocorp Display Systems, Sunnyvale, Calif.

[21] Appl. No.: 245,454

[22] Filed: May 18, 1994

Related U.S. Application Data

[63] Continuation of Ser. No. 812,730, Dec. 23, 1991, abandoned.

[51] Int. Cl.$^6$ ............................................. G09G 3/36
[52] U.S. Cl. ..................................... 345/102; 345/75; 345/5
[58] Field of Search .................. 345/4, 5, 74, 75, 102

[56] References Cited

U.S. PATENT DOCUMENTS

| | | |
|---|---|---|
| 3,783,184 | 1/1974 | Ernstoff . |
| 4,593,977 | 6/1986 | Takamatsu et al. . |
| 4,610,507 | 9/1986 | Kamamori et al. . |
| 4,610,509 | 9/1986 | Sorimachi et al. . |
| 4,752,771 | 6/1988 | Katogi et al. . |
| 4,763,187 | 8/1988 | Biberian ............................ 345/75 |
| 4,767,186 | 8/1988 | Bradley, Jr. et al. . |
| 4,773,885 | 9/1988 | Uehara et al. . |
| 4,791,415 | 12/1988 | Takahashi . |
| 4,832,461 | 5/1989 | Yamagishi et al. . |
| 4,901,140 | 2/1990 | Lang et al. . |
| 4,907,862 | 3/1990 | Suntola . |
| 4,958,911 | 9/1990 | Beiswenger et al. . |
| 5,093,652 | 3/1992 | Bull et al. ......................... 345/102 |
| 5,121,233 | 6/1992 | Spencer et al. .................. 340/784 |
| 5,128,782 | 7/1992 | Wood ................................ 345/102 |
| 5,142,388 | 8/1992 | Watanabe et al. ............... 340/781 |
| 5,157,524 | 10/1992 | Dijon et al. ...................... 345/89 |

FOREIGN PATENT DOCUMENTS

| | | |
|---|---|---|
| 0261896 | 3/1988 | European Pat. Off. . |
| 0369730 | 5/1990 | European Pat. Off. . |
| 61-224256 | 10/1986 | Japan . |
| 2112145 | 4/1990 | Japan . |
| 2136186 | 9/1984 | United Kingdom . |
| WO8802129 | 3/1988 | WIPO . |
| WO91/10223 | 7/1991 | WIPO . |

OTHER PUBLICATIONS

Coloray Display Corporation, "Field Emulsion Display Technology Review" Technical Note #01, Oct. 1990, pp. 1 to 7.

Hayashi, et al. "A 15-mm Trio Pitch Jumbotron Device", *SID 89 Digest*, pp. 98–101.

Research Disclosure, Jan. 1991, entitled "Cathodoluminescent Backlight for Liquid Crystal Displays", p. 74.

"Gray-Scale Ferroelectric Liquid Crystal Devices," by Armitage, *Liquid Crystal Displays and Applications*, SPIE vol. 1257:pp. 116–124 (1990).

"A Passive-Matrix-Addressed Ferroelectric Liquid-Crystal Video Display," by Hartmann et al., *Proceedings of the SID*, vol. 32/2:pp. 115–120 (1991).

*Primary Examiner*—Jeffery Brier
*Attorney, Agent, or Firm*—Majestic, Parsons, Siebert & Hsue

[57] ABSTRACT

An electronic fluorescent device (EFD) is used as the back light source for a black/white LCD. Where the EFD provides red, green and blue light, the LCD displays multi-color or full-color images. The EFD includes a number of cathodes disposed in a vacuum chamber, an anode, phosphor strips near the anode, and grid electrodes for controlling the timing of the light generation and sequential color addressing. The control system may be such that the transmission rate of the LCD is proportional to the amplitude of the input signal forming an analog system; the EFD then simply provides sequential red, green and blue light pulses of constant intensity. Alternatively, selected pixels of the LCD may be addressed digitally to be either on or off, and the intensities of the red, green and blue pulses provided by the EFD are varied. In both instances, full scale gray tone monochromatic, multi-color or full-color images can be achieved.

40 Claims, 12 Drawing Sheets

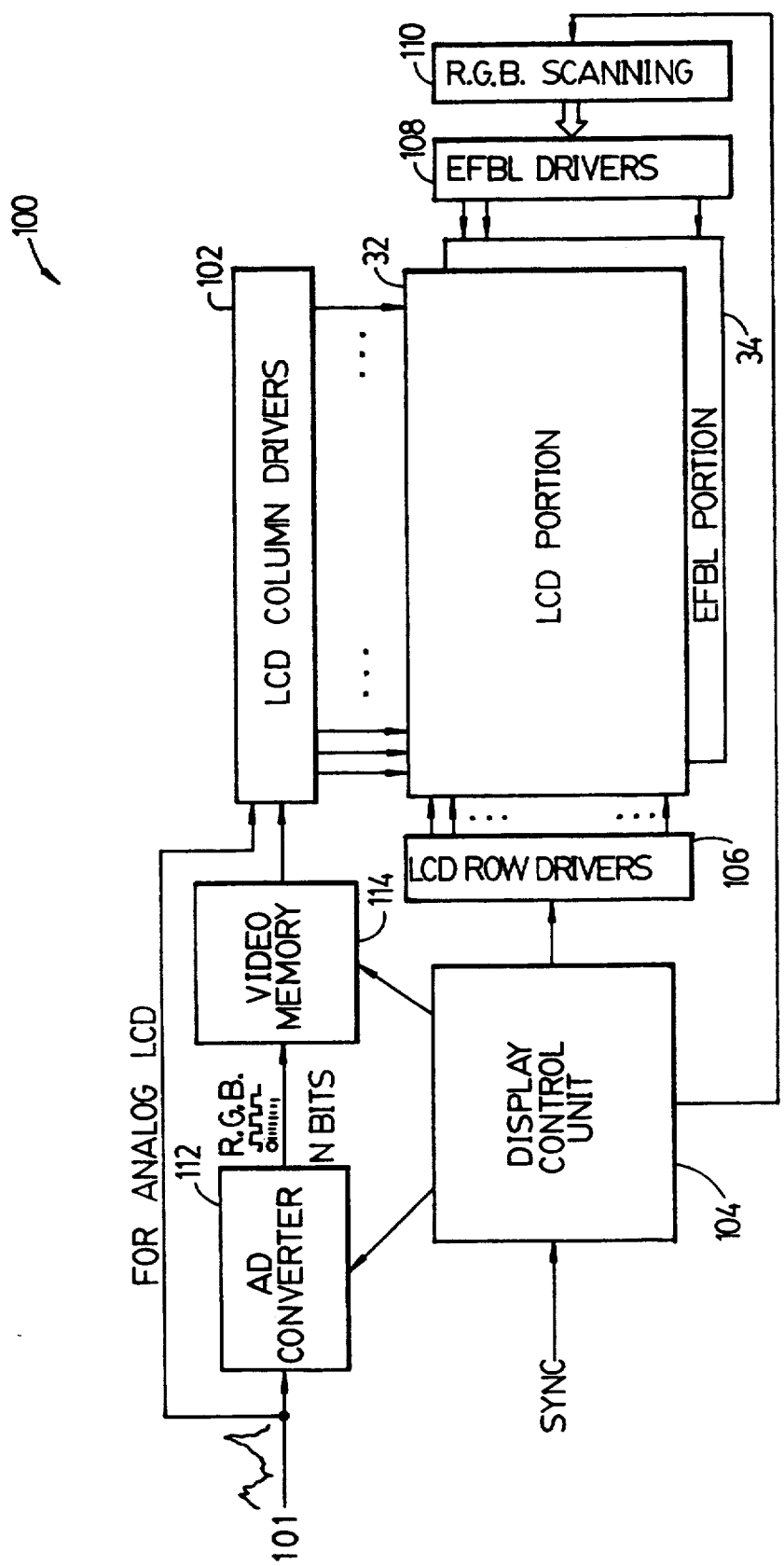
FIG._2

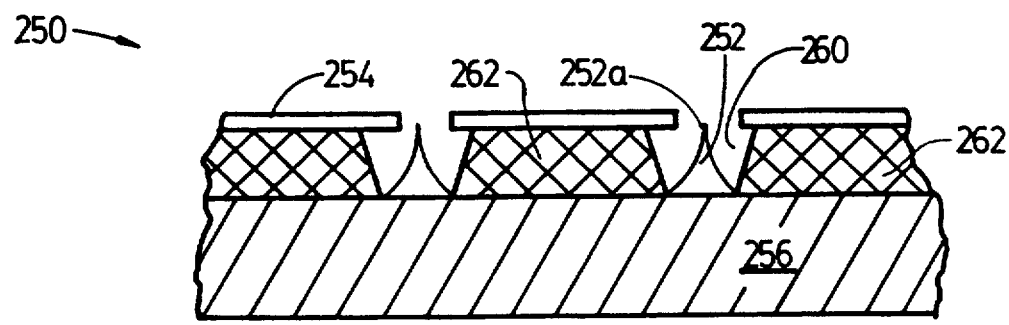
FIG._7.
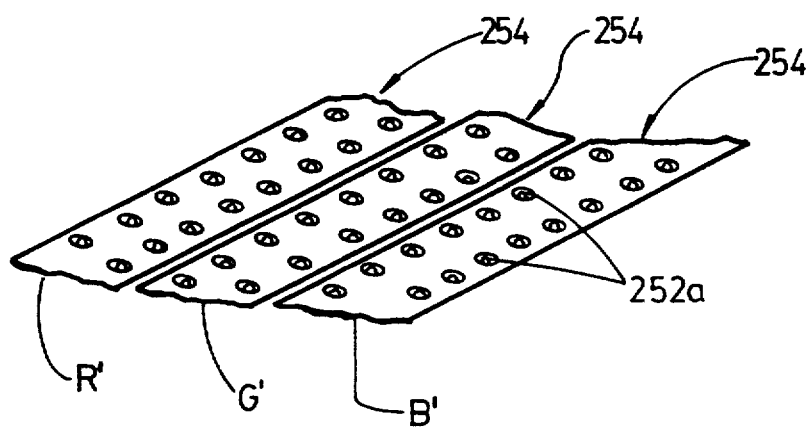
FIG._8.

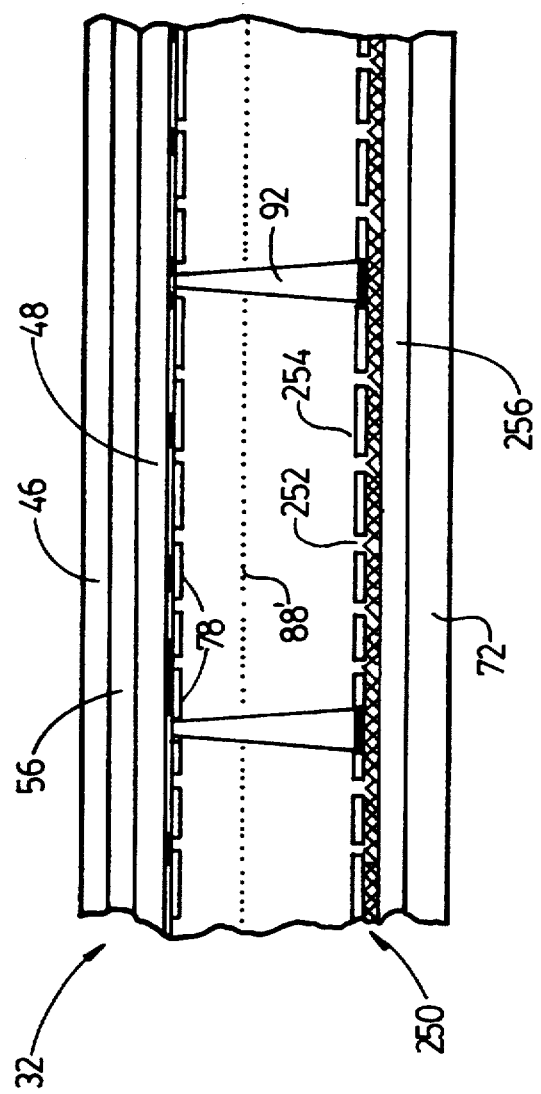

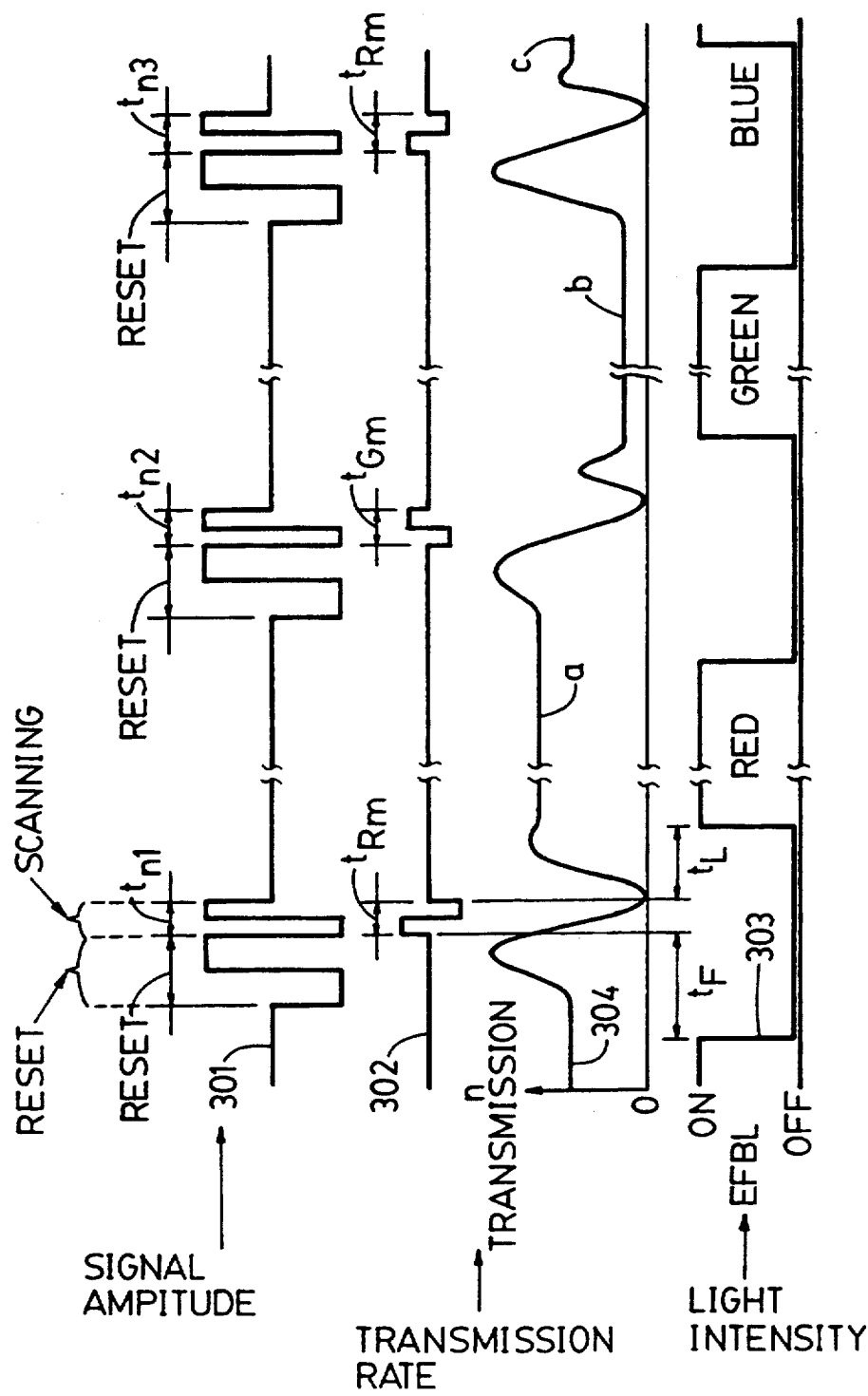
FIG._10.

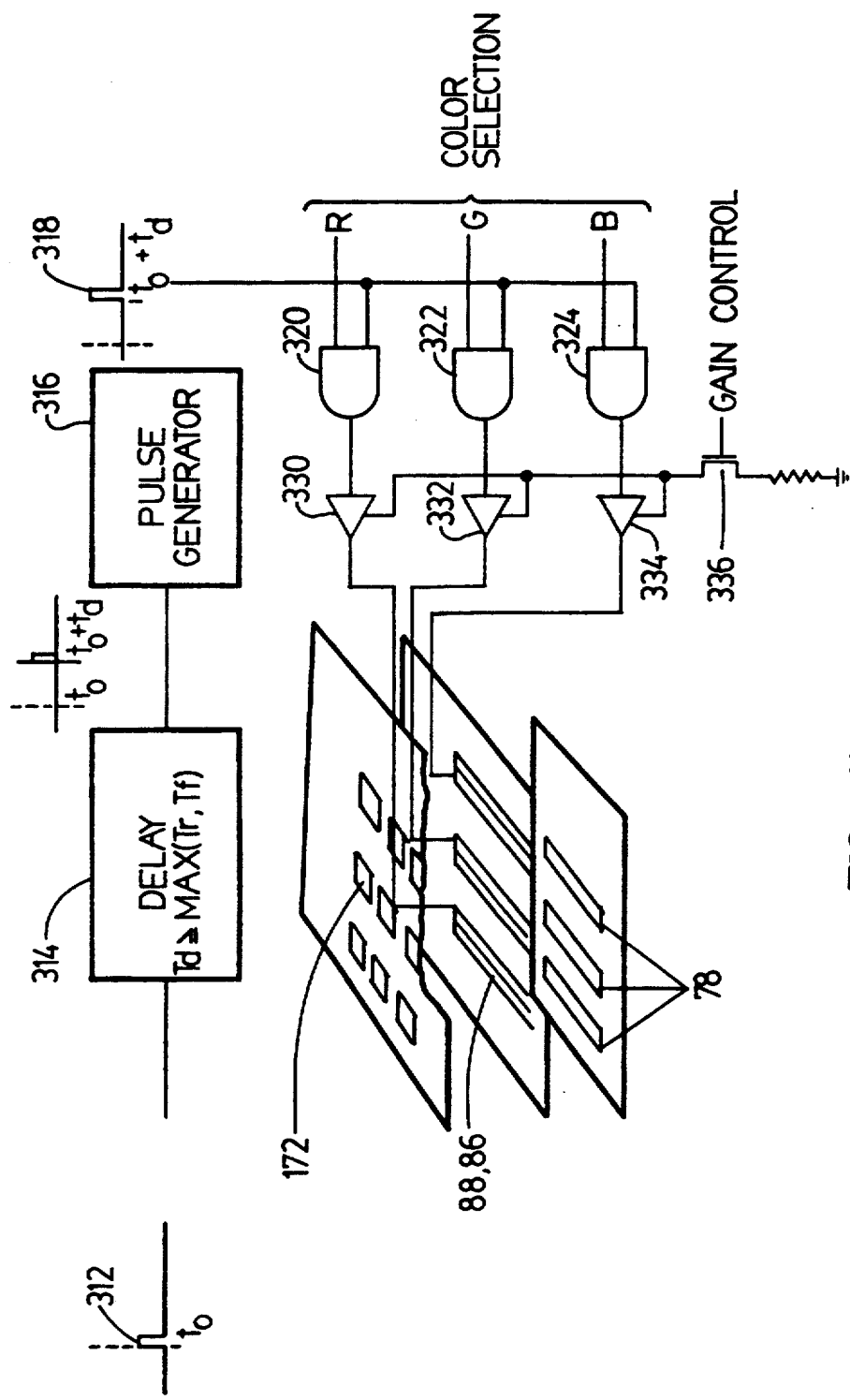
FIG._11.

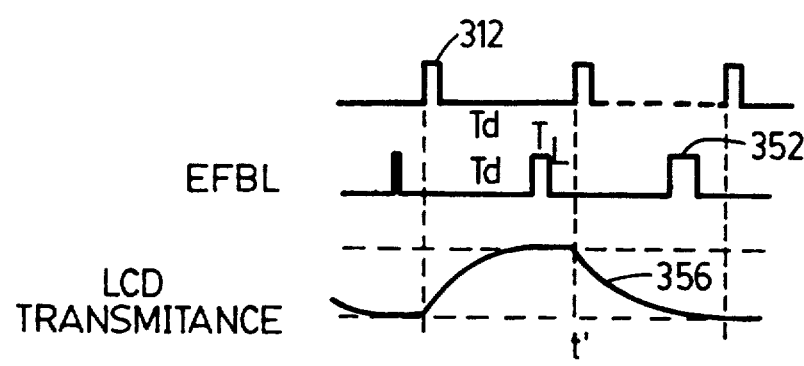
FIG._12.

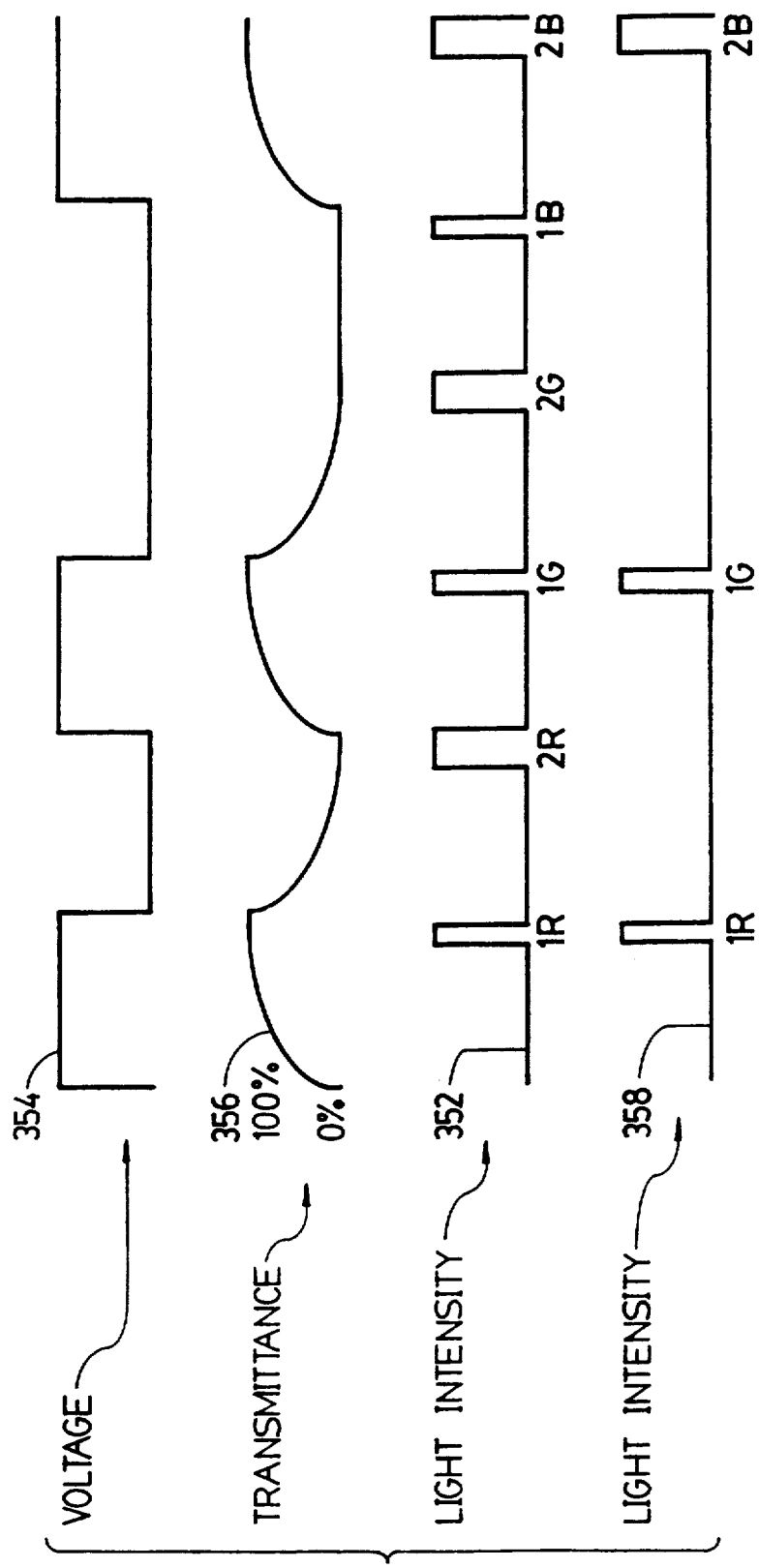
FIG._13.

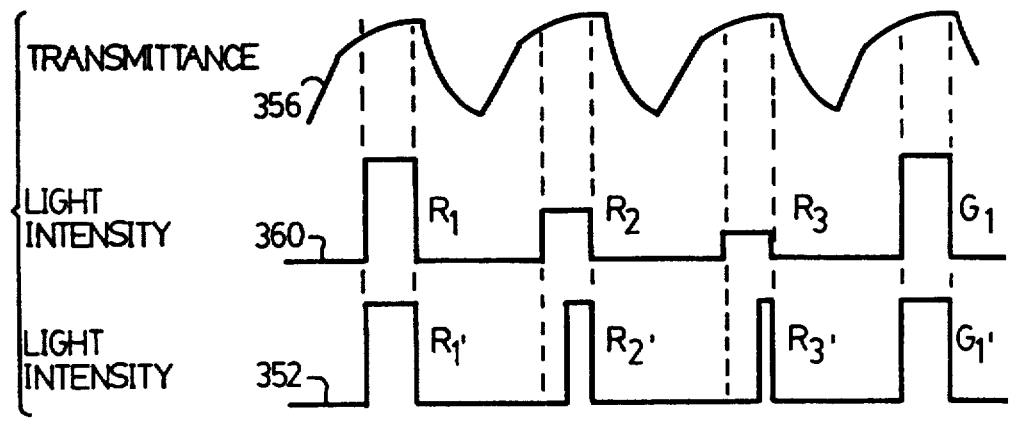
FIG._14.
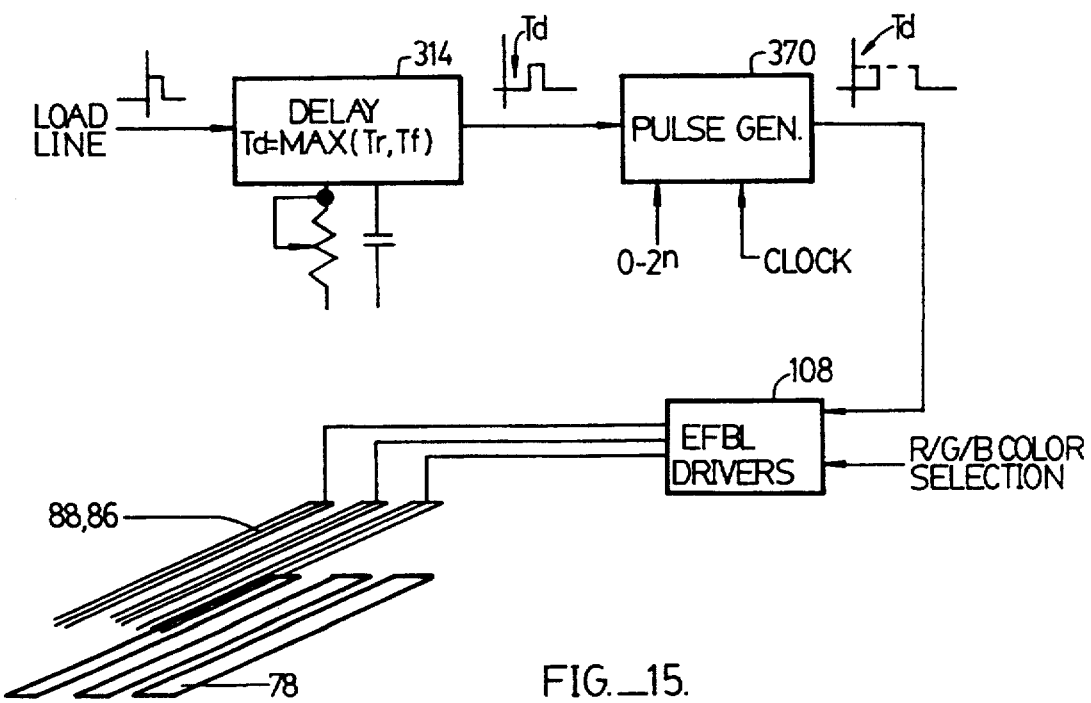
FIG._15.

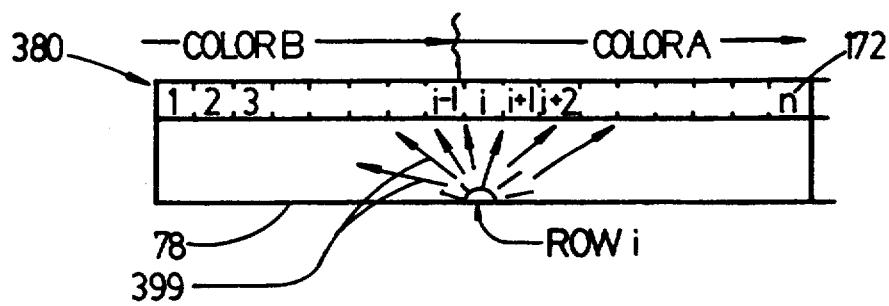
FIG._16.
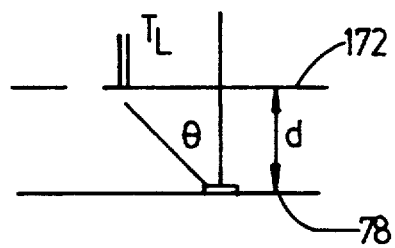
FIG._17.
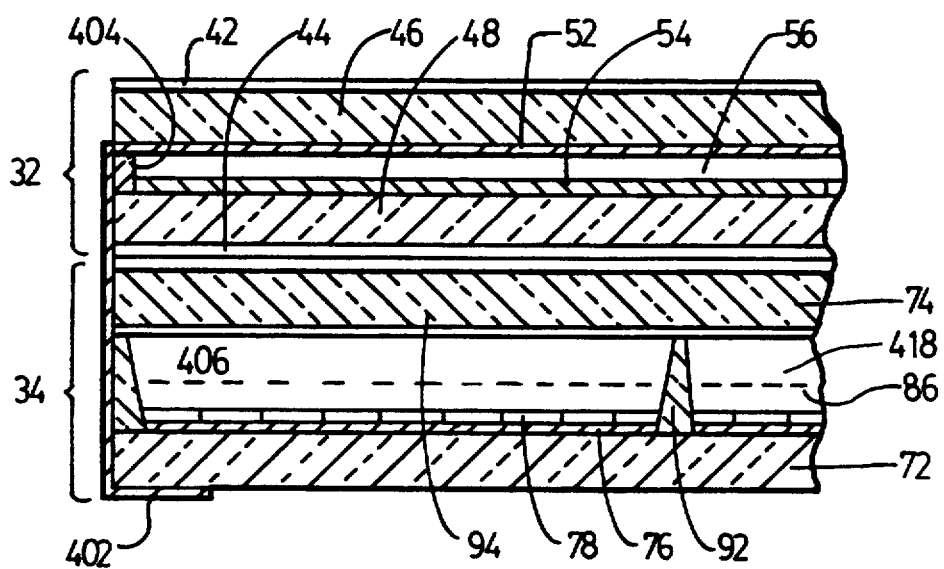
FIG._18.

COLOR FLUORESCENT LIQUID CRYSTAL DISPLAY

This is a continuation of application Ser. No. 812,730, filed Dec. 23, 1991, now abandoned.

BACKGROUND OF THE INVENTION

This invention relates in general to an efficient display device capable of displaying monochromatic, multi-color and full-color images of high brightness and resolution. Specifically, the invention relates to a liquid crystal device (LCD) without color filters, where the LCD is illuminated by a back lighting source, which is an electronic fluorescent source emitting monochromatic light or light of multiple colors, such as the three primary colors of red, blue and green.

LCDs are one of the most widely used type of devices. However, most of the LCDs used today are monochromatic. While multi-color and full-color LCDs have been proposed, their development has been hindered by a number of technical difficulties. In most of the multi-color and full-color LCDs proposed, a back light source is employed. However, in most cases, the back light source employed is white light. Therefore, to produced composite images of different color, red, blue and green filter arrays have been used. For each pixel, the white light directed towards a portion of the pixel is filtered to permit only red light to pass, and white light directed toward another portion of the same pixel is filtered to permit only blue light to pass and the white light directed towards the remaining portion is filtered to permit only green light to pass. Thus only a small part of the energy of the white light is transmitted through the LCD. If relatively pure red, blue and green light is desired, the filters employed must have narrow pass bands, so that the percentage of the energy of the white light utilized is further reduced. Alternatively, if a brighter display is desired, the user may have to compromise on the color quality and utilize red, blue and green filters with broader pass bands.

LCD cells respond slowly to voltages applied across them. Typically, when scanning voltages are first applied to a LCD cell, the cell has low transmission rate. The transmission rate rises slowly during the scanning cycle so that a low percentage of light is passed by the red, blue and green filters and transmitted through the LCD cells during the scanning cycle. This is a notable drawback of passive matrix type LCD color displays, where no drivers are used contiguous to the LCD cells for driving the cells.

To improve display brightness, active matrix LCD cells are proposed by adding at least three thin film transistors for each LCD cell or pixel for accelerating the turning on and off of the three portions of the cell or pixel for light transmission of the three different colors. Such transistors, however, are opaque and occupy a significant area of the LCD cell. In other words, whatever the designer may have gained by increasing the transmission rate, the designer will lose at least part of the advantage because of the reduction of the area of the cell that actually transmits light.

A further complication in the active matrix LCD type displays is in manufacturing. Thus if a thin film transistor in one of the LCD pixels or cells is defective, the entire display is useless and must be discarded. Because of yield problems, redundant transistors are implemented. However, adding more thin film transistors further reduces the light transmitting portion of the pixel and is undesirable. For a display with many pixels, the reduction in area is considerable. For example, for a 480 by 240 pixel display, 480×240×3 transistors must be used even without any redunduncy in transistors. If redundunt transistors are included, such as by using two transistors for each color in a pixel, 480×240×3×2 transistors must be used.

For the reasons above, it is difficult to use the above-described conventional designs to achieve efficient color LCD displays of high brightness, good color and high resolution. This is particularly the case for large displays. It is therefore desirable to provide an alternative design for color LCD displays which are inexpensive and where the above-described difficulties are avoided or alleviated.

SUMMARY OF THE INVENTION

This invention is based on the observation that the above-described difficulties of conventional color LCDs can be alleviated or avoided altogether by using an electronic fluorescent device (EFD) as the back light source in place of a white light source with filters. The flat panel color display apparatus of this invention comprises a layer of liquid crystal material, means for addressing locations on said layer to cause said layer to modulate the intensity of light transmitted through said layer at selected locations, and a back light source for supplying light towards the liquid crystal layer. The back light source comprises a housing defining therein a vacuum chamber, a plurality of cathodes disposed in the chamber, means for causing the cathodes to emit electrons and an anode in the chamber. The source further includes control means in the chamber for causing the electrons emitted by the cathodes to travel towards the anode at selected locations, and means disposed in the chamber at or near the anode and responsive to said electrons- for generating and directing light toward the layer of liquid crystal material.

BRIEF DESCRIPTION OF THE DRAWINGS

FIG. 2 is a block diagram of an electronic control system for applying various voltages and signals to the device of FIG. 1 to illustrate the invention.

FIG. 7 is a cross-sectional view of a portion of an electronic fluorescent LCD device employing cone-shaped field electron emitting cathode structures to illustrate another embodiment of the invention.

FIG. 8 is a perspective view of the top surfaces of the gates and the tip portions of the cathodes of the electronic fluorescent LCD device of FIG. 7.

FIG. 9 is a cross-sectional view of a portion of the electronic fluorescent LCD device of FIGS. 7 and 8.

FIG. 10 is a timing diagram illustrating the addressing and control signals applied by an address and control system such as that of FIG. 2 to an analog gradation electronic fluorescent LCD device to illustrate the invention.

FIG. 11 is a block diagram of a control system for operating an analog gray scale electronic fluorescent LCD to illustrate the invention.

FIG. 12 is a timing diagram of control signals and the transmittance of the LCD to illustrate a digital gray scale electronic fluorescent LCD to illustrate the invention.

FIG. 13 is a timing diagram of control signals for electronic fluorescent LCD device to illustrate in more detail the scheme of FIG. 12 for generating digital gray tone values.

FIG. 14 is a timing diagram of control signals to illustrate alternative schemes to that of FIGS. 12, 13 for implementing digital gray tone values.

FIG. 15 is a schematic circuit diagram illustrating a control circuit for generating the control signals of FIGS. 12, 13.

FIG. 16 is a schematic view of a portion of an electronic fluorescent LCD device to illustrate an aspect of the invention for reducing crosstalk.

FIG. 17 is a schematic view illustrating the effect of turning off early the data-pulse to the electronic fluorescent device in reducing crosstalk.

FIG. 18 is a cross-sectional view of an electronic fluorescent LCD to illustrate a mosaic type display.

DETAILED DESCRIPTION OF THE PREFERRED EMBODIMENT

Figure 1:
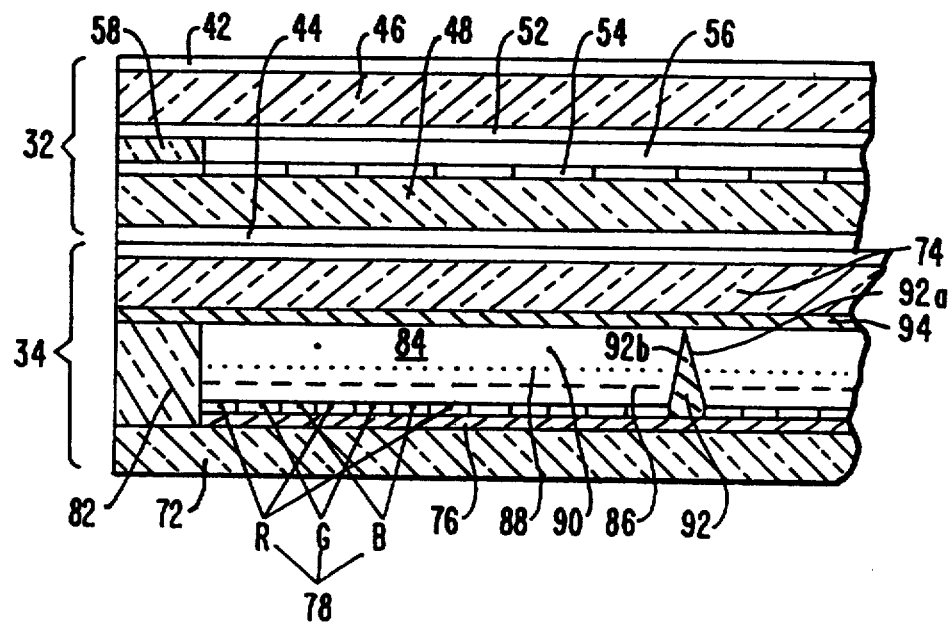
FIG. 1 is a cross-sectional view of a portion of a passive matrix electronic fluorescent LCD to illustrate an embodiment of the invention.

FIG. 1 is a cross-sectional view of the portion of an electronic fluorescent LCD (EFLCD) to illustrate one embodiment of the invention where the LCD device therein is the passive type with no devices contiguous to the LCD pixels or cells for driving the cells. As shown in FIG. 1, EFLCD 30 comprises the passive matrix LCD 32 and an electronic fluorescent device (EFD) 34. LCD 32 is a black/white LCD without color filters and EFD 34 emits substantially monochromatic light or light of different colors as a back light source. The addressing and control systems for addressing and controlling LCD 32 and EFD 34 are synchronized so that, where EFD emits light of different colors, the combination of the devices of 32 and 34 turn an originally black/white LCD 32 into a high brightness and efficient multi-color or full-color display with good color. While in the preferred embodiment, EFD 34 emits light of multiple colors, such as red, blue and green light, it will be understood that EFD 34 may also be monochromatic.

In FIG. 1, LCD 32 may be a black and white digital LCD, or a single-matrix or multi-matrix passive LCD, or an active matrix LCD with thin film transistors (TFT) but can also be a digital modulation or analog modulation LCD. When combined with an electronic fluorescent back lighting source 34, the combination can achieve many different display functions.

LCD 32 comprises polarizers 42, 44, face plate 46 and back plate 48, and two groups of preferably mutually perpendicular x, y electrodes 54, 52 respectively, a layer of liquid crystal material 56, and side sealing walls 58. As in conventional LCDs, the row or x electrodes are elongated and form a substantially coplanar array where the electrodes are preferably substantially parallel to one another. The y or column electrodes 52 are similarly elongated and form a substantially coplanar array of preferably substantially parallel electrodes. Thus each column electrode overlaps each of the row electrodes, where the overlapping square or rectangular area of a row electrode and a column electrode defines a pixel of LCD 32 and of the EFLCD 30. Thus the pixels of EFLCD form an array with linear rows of pixels parallel to and aligned with the array of row electrodes 54. While in the description above in reference to FIG. 1, the row electrodes 54 are the scanning electrodes, it will be understood that the column electrodes 52 may be used for scanning, in which case the array of corresponding pixels will be scanned column by column instead. All such variations are within the scope of the invention. As described in detail below, scanning signals are applied to the row electrodes 54 and data signals are applied to the column electrodes 52 where the scanning and data signals together control the transmission rate of each pixel of the light passing therethrough. The above-described structure and operation of LCD 32 is that of a passive, simple matrix type conventional LCD.

In the embodiment of FIG. 1, EFD 34 is a full-color electronic fluorescent back light (EFBL) source which provides red, green and blue luminescence. EFD 34 comprises a back plate 72 and a face plate 74, anode 76 on the internal surface of back plate 72, and elongated red, green and blue primary color phosphor strips 78 on the anode. Back plate 72, face plate 74 and side plate 82 form a housing which enclose therein a sealed chamber 84 which is evacuated. Disposed in vacuum chamber 84 is a first set of grid electrodes 86 and a second group of grid electrodes 88, and cathodes 90.

Filaments of cathodes 90 may be the type that are provided with direct heating oxide coatings. In the embodiment of FIG. 1, when filaments 90 are heated by means of rated heating voltage, the filaments emit electrons. A voltage difference is applied between the cathodes 90 and anode 76 so that the electrons emitted by the cathodes will travel towards the anode. When these electrons impinge on the phosphor strips 78, the phosphor strips will respond by generating red, green or blue light. The surface of the anode facing the LCD 32 is highly light reflective to increase the efficiency of the device.

Three types of phosphor strips are employed: the first type generates red light, the second type green light, and the third type blue light, in response to electrons. The light generated by phosphor strips 78 are transmitted across chamber 84 through face plate 74 to the LCD 32. When selected pixels of LCD 32 are rendered light transmitting, the light emitted by the phosphor strips 78 will be transmitted through such pixels to display images of the required colors. To achieve uniform back lighting intensity, it is preferable to employ denser narrow arrays of phosphor strips 78 where the width of the individual strips are small compared to the widths of electrodes 52 or 54 of LCD 32. The outside surface and/or inside surface (that is, the surface closer and adjacent to vacuum chamber 84) are diffusion surfaces to increase the uniformity of the back lighting intensity.

To provide support to the face and back plates 74, 72 against atmospheric pressure, spacers 92 are employed to provide sufficient mechanical strength to the housing of EFD 34 and so that the face and back plates can be made relatively thin even when they have large surface areas. In such manner, a flat panel color electronic fluorescent LCD 30 is provided where the total thickness of device 30 may be less than 2 cm.

Preferably, to reduce any dark areas that may be visible on the display screen, spacers 92 are elongated members with a wedge-shaped cross-section with a thinner side 92a facing LCD 32 as shown in FIG. 1. The two slanting side surfaces 92b are highly reflective diffusing surfaces in order to reflect light impinging thereon towards the LCD 32, in order to further reduce any dark areas that may be visible through LCD 32, in order to achieve uniform intensity back lighting. Preferably, as shown in FIG. 1, layer 94 is a transparent conductive film on the internal surface of face plate 74; conductive film 94 reduces any effect of extraneous electric and magnetic fields on the EFBL 34.

LCD device 32 is addressed in a conventional manner. Typically, row electrodes 54 and the corresponding rows of pixels are scanned one at a time and sequentially, for example, from the top row towards the bottom row, until the bottom row is reached at which time the top to bottom scanning process is repeated. At the same time, data signals are provided to column electrodes 52, where the scanning signals to row electrodes 54 and data signals to column electrodes 52 together would determine whether any particular pixel is rendered light transmitting or not as well as determining the transmission rate of the pixel as is known to those skilled in the art. For this reason, the detailed working mechanism of LCD 32 will not be elaborated here. Since the LCD 30 is typically scanned one row electrode or one column electrode at a time, for improved efficiency, it may be desirable to provide back lighting only to the portion of the LCD which is being scanned. For this reason, preferably the elongated phosphor strips 78 are arranged substantially parallel to the array of electrodes being scanned; in the case of FIG. 1, strips 78 are arranged parallel to the array of row electrodes 54 which are scanned one at a time from top to bottom. In FIG. 1, for example, during operation of the device, the left edge of device 30 is rotated to become the top surface so that the leftmost row electrode 54 becomes the top electrode and the scanning proceeds from the top electrode downwards.

For improved efficiency, during the scanning of the topmost four or five row electrodes 54 (that is, the four or five near side wall 58, all shown in FIG. 1), only the cathodes 90 and the grid electrodes between the side plate 82 and spacer 92 need to be used for generating back light. Thus the plurality of spacers 92 may be provided in chamber 84 to divide the chamber into a number of subchambers. A control means described in detail below is then used for applying different voltages to the cathodes and the grid electrodes to cause the cathodes and grid electrodes in each subchamber to generate electrons so that only the phosphor strips disposed within the subchamber will emit light towards through the row electrodes 54 which are being scanned at the same time. In this manner, the operation of device 30 is made more efficient. Moreover, the phosphor strips are arranged to alternate periodically in the repetitive order (e.g. R, G, B, R, G, B, . . . ) as illustrated in the figures.

FIG. 2 is a block diagram of a system 100 illustrating one embodiment of the addressing and control system of the EFLCD device of this invention. For simplicity, identical components in the different figures of this application are referred to by the same numerals. The LCD 32 may be controlled via analog signals where the transmission rates of a number of selected pixels in a row of pixels being scanned are proportional to the amplitudes of analog input signals. In such event, the LCD column drivers 102 are controlled directly by the analog input to generate the analog data signals applied to the column electrodes of LCD 32. In such case, the EFBL 34 would simply provide constant amplitude and fixed width red, green and blue pulses in synchronism with the LCD addressing to provide red, green and blue light of different gray tones that are transmitted through the LCD 32. Such analog addressing will be described in more detail below in reference to FIGS. 10 and 11.

Alternatively, each scanning cycle will be divided into three, six, nine, twelve, . . . , (increasing as multiples of three) segments, and during each segment of the scanning cycle, each pixel in the pixel row scanned is either entirely closed to light transmission or fully turned on for maximum light transmission. In synchronism therewith, the display control unit 104 then generates a fixed sequential pattern of voltage pulses applied to the EFBL 34 for generating a fixed pattern of varying intensities of red, green and blue light pulses. Each segment of the scanning cycle of the LCD 32 corresponds to each of the red, green and blue light pulses. By selecting to pass or not to pass each of such pulses during each segment of the scanning cycle, different gray tone red, green and blue light transmission through the LCD 32 is accomplished. Such digital operation will be described below in reference to FIGS. 12-15.

In reference to FIG. 2, display control unit 104 generates scanning pulses for driving the LCD row drivers 106 which in turn generate the scanning pulses for scanning the rows of electrodes LCD 32. Display control unit 104 also generates the RGB data pulses which are fed to EFBL drivers 108 through RGB scanning unit 110. Where the scanning cycle is to be divided into a number of scanning segments, the input signal fed at 101 is converted by A/D converter 112 into a sequence of bits for controlling whether the pixels in the scanned pixel row should be on or off. Such sequence of bits are stored in the video memory 114 and are then fed to LCD column drivers 102 for controlling turning on and off the pixels in the scanned pixel row in LCD 32. The operation of AD converter 112 and memory 114 are controlled by display control unit 104. The display control unit 104 also generates a stream of digital signals to RGB scanning unit 110 and EFBL drivers 108 for generating fixed patterns of voltage signals for application to the cathodes and grid electrodes of the EFBL 34 for generating a selected one of a number of fixed patterns of red, green and blue light pulses.

Figure 3:
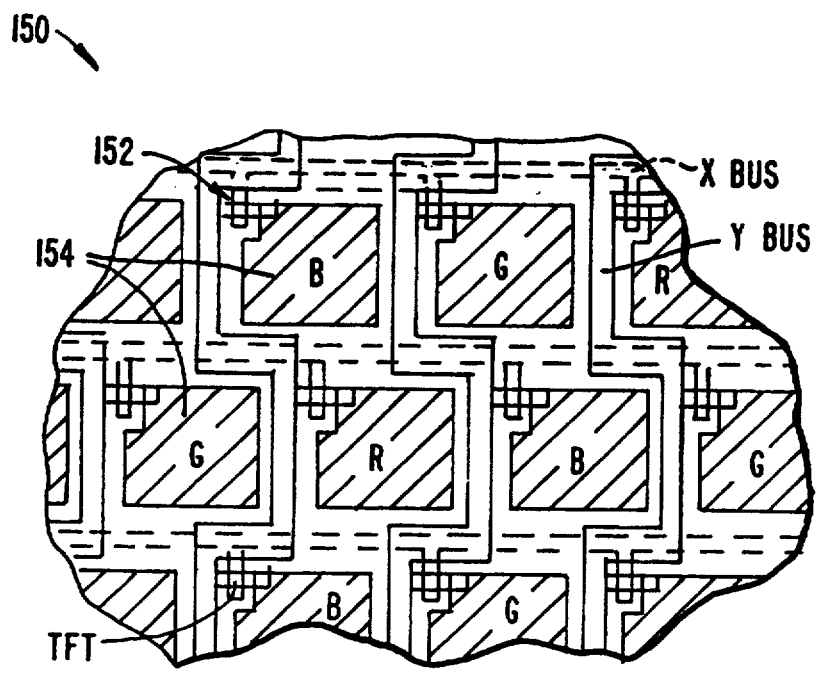
FIG. 3 is a schematic view of a portion of an active matrix conventional LCD device.

In the embodiment of FIG. 1, LCD 32 is a passive matrix device with no active devices implemented adjacent to the LCD layer 36 for driving the LCD pixels. As indicated above, passive matrix LCD devices are slow. For this reason, active matrix LCD devices have been proposed such as those illustrated in FIG. 3. As shown in FIG. 3, 150 is a schematic view of a portion of a conventional active matrix LCD where thin film transistors 152 are implemented contiguous to the pixels for driving the pixels. As can be seen from FIG. 3, since conventional color LCD devices employ filters which permit only one of either red, green or blue light to pass, these filters cannot overlap so that each individual pixel must comprise subpixels each designated to transmit only red, green or blue light. For this reason, in order to produce a full range of multi-color or full-color images, each pixel must comprise at least three subpixels 154. These subpixels are typically sequentially addressed one row at a time at a relatively high frequency so that, to the eyes of an observer, all three colors are stably displayed. Where the subpixels are sufficiently small, the red, green and blue subpixels will appear to merge to give the uniform color of a particular color with gray tones.

In FIG. 3, the x bus carries scanning signals for scanning rows of subpixels and the y bus carries data signals which together with the scanning signals modulate the transmission rate of each pixel. As can be observed from FIG. 3, in order to address the three subpixels of each pixel individually, a significant percentage of the display area is occupied by the x and y buses. If thin film transistors such as transistors 152 are employed to speed up the LCD, additional areas of the LCD display screen will be occupied by these transistors, thereby further reducing the percentage of the display screen which can transmit light. As noted above, because of yield problems, sometimes two thin film transistors are employed for each subpixel; in such event, even a larger percentage of the area of LCD display screen is occupied by opaque circuit elements. For the above reasons, conventional color LCD does not provide images of good brightness and is inefficient.

Figure 4:
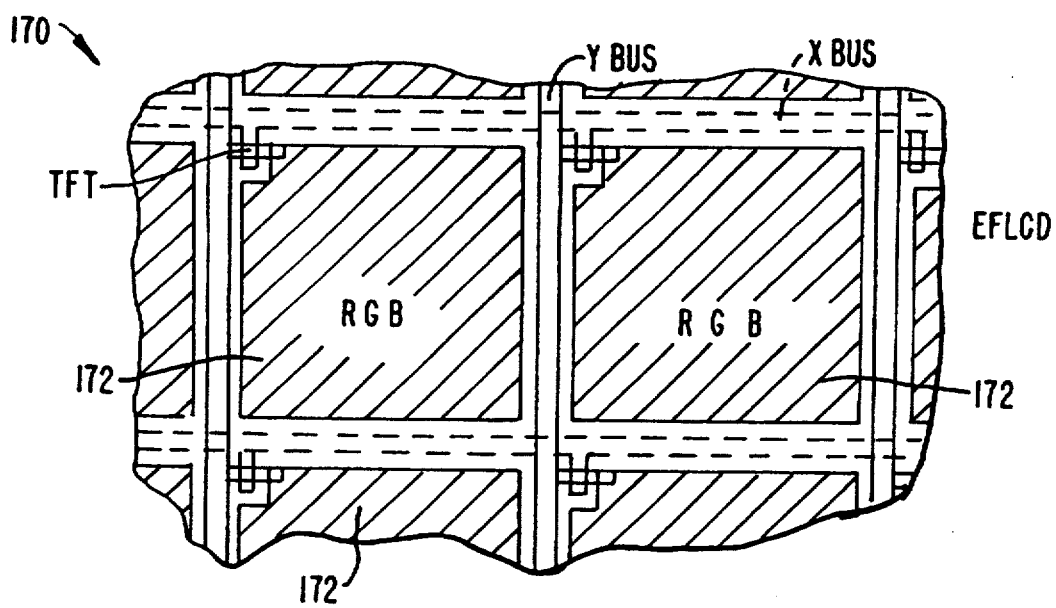
FIG. 4 is a schematic view of a portion of an active matrix electronic fluorescent LCD device to illustrate an embodiment of the invention.

FIG. 4 is a schematic view of a portion of an active matrix color LCD device to illustrate this invention. In contrast to the conventional device 150, in device 170 of this invention, no color filters are employed and each pixel is used to transmit all colors of the back light source. Thus if the back light source emits red, green and blue light, each pixel such as pixels 172 will all transmit red, green and blue light throughout their entire areas. The back light source may be caused to emit sequentially red, green and blue light at a sufficiently high frequency so that to an observer, a multi-color or full-color image will be observed. To achieve the same resolution as conventional device 150, the pixels 172 may each be three times larger than the subpixels 154 of device 150 so that pixels in device 150 are roughly of the same size as pixels 172. However, in comparison to device 150, device 170 devotes much less percentage of its area to the x and the y buses than the y device 150 since only one set of lines will be adequate to address each pixel 172 instead of three sets required for device 150. Alternatively, if the pixels 172 are made to be of the same size as subpixels 154 of device 150, device 170 can achieve three times the resolution of device 150 with the same overhead devoted to the x and y buses and to the thin film transistors.

Figure 5:
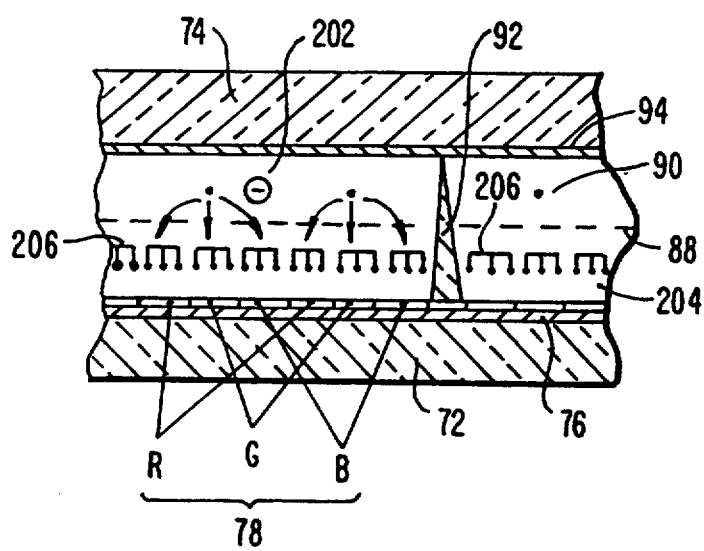
FIG. 5 is a cross-sectional view of an electronic fluorescent LCD device to illustrate further features of the invention.

FIG. 5 is a cross-sectional view of a portion of an EFD 200 suitable for use in the EFLCD of this invention to illustrate the preferred embodiment of the invention. As noted above, the generation of electrons and the control of their passage to the phosphor strips are such as to cause the phosphor strips to generate red, green and blue light sequentially, but not all at the same time. For this purpose, it is desirable for the electrons generated to be directed only towards the phosphor strips that generate one of red, green or blue light and not at the same time directed towards phosphor strips that generate the other two kinds of light. As shown in FIGS. 1 and 5, the phosphor strips that generate only red light are labeled R, those that generate only green light labeled G, and those that generate only blue light labeled B. Thus the cathodes 90 are heated by rated heating voltage from unit 104 through EFBL drivers 108 to generate electrons 202.

When red light is to be generated, appropriate voltages are then applied to the first set of grid electrodes 204 in FIG. 5 to thereby cause electrons 202 to be directed only towards the phosphor strips R, and not towards the phosphor strips G, B. During the time interval during which green light is to be emitted by the EFD 200, the voltages applied to the grid electrodes 204 should be such that the electrons should be directed only towards the phosphor strips labeled G. The same is true during the time interval for generating blue light, during which the electrons are to be directed only towards the phosphor strips B. Typically, this can be achieved by applying a more positive voltage to the grid electrodes in the first set 204 that are aligned with and correspond to the appropriate set of phosphor strips and a more negative voltage to the remaining grid electrodes in the first set. Thus as shown in FIG. 5, each phosphor strip has aligned with it and corresponding thereto, three grid electrodes in the first set 204, where the three corresponding electrodes are connected together by an electrical conductor 206 so that when the appropriate voltage is applied to one of the three grid electrodes, all three grid electrodes will be at the same voltage. Such connection renders the voltage uniform between the three grid electrodes corresponding to a phosphor strip and improves the uniformity of the light emission of the EFD 200 and therefore the overall quality of the display using the EFD. So aligning the three corresponding grid electrodes with their corresponding phosphor strip and applying appropriate voltages reduce the number of electrons directed towards other phosphor strips, and also reduce the intensity of light of other colors generated unintentionally. Such feature therefore reduces crosstalk between adjacent phosphor strips and the extraneous light of other unwanted colors will be reduced.

Figure 6:
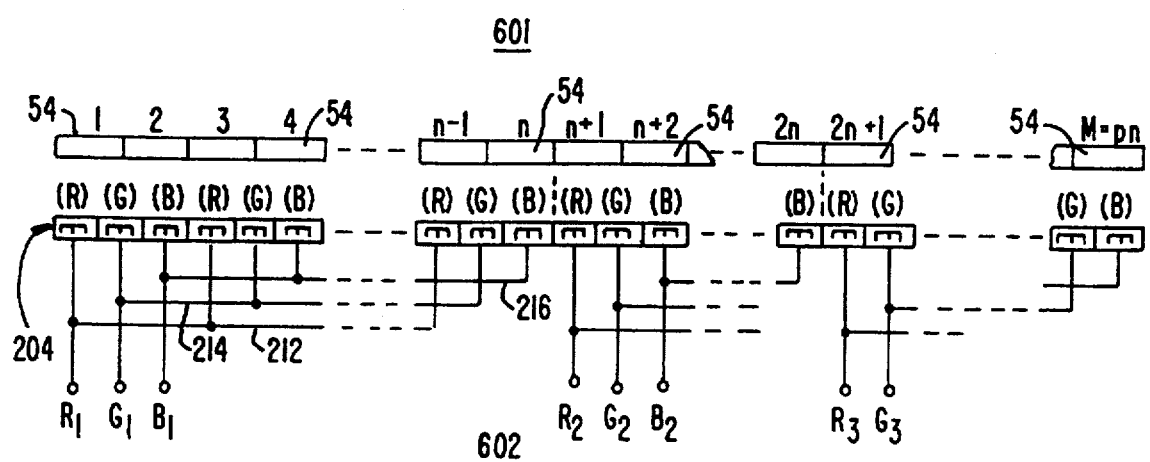
FIG. 6 is a schematic view showing electrical connections between the grid electrodes of an EFD for addressing different phosphor strips that correspond to M pixel arrays to illustrate the invention.

As noted above, spacers 92 divide chamber 84 into a number of subchambers so that light emitted by phosphor strips will be transmitted only through the pixels in the pixel row and not towards the pixels that correspond to the phosphor strips in a different subchamber. Thus the light passing through the pixels in the scanned pixel row may originate from a number of different phosphor strips in the same subchamber. To further improve the uniformity of the display, it is desirable to provide substantially the same voltage to the grid electrodes in the subchamber that correspond to and align with each of the phosphor strips in the subchamber that generate light of the same color. FIG. 6 is a schematic view illustrating a scheme of connections which is particularly useful to accomplish such purpose. As shown in FIG. 6, the first set of grid electrodes 204 are divided into a number of subgroups of three grid electrodes each, where each subgroup is aligned with and correspond to a phosphor strip, where a subgroup corresponding to a phosphor strip for generating red light is labeled "R", the subgroup aligned with and corresponding to a phosphor strip for generating green light is labeled "G", and a subgroup aligned with and corresponding to a phosphor strip for generating blue light is labeled "B". Each subchamber contains a number of phosphor strips and a corresponding number of subgroups of grid electrodes of three grid electrodes each. As shown in FIG. 6, all the subgroups labeled "R" are connected together by electrical connector 212 and to a terminal $R_1$. All the subgroups labeled "G" are connected together by an electrical connector 214 to a terminal $G_1$. All the subgroups labeled "B" are connected by an electrical connector 216 to a terminal $B_1$. Therefore, by applying the appropriate voltage to the three terminals $R_1$, $G_1$, $B_1$, the subgroups that are connected to the appropriate terminal will all be at the same voltage which improves the uniformity of the light intensity generated by phosphor strips of the same color within the same subchamber.

As shown in FIG. 6, the EFLCD has a total number of M pixel arrays, corresponding to M row or column electrodes in the LCD. The M row or column electrodes therefore correspond to M pixel arrays. The M row or column electrodes are divided into p groups of n rows or columns each, wherein the phosphor strips (not shown in FIG. 6) are also divided into p groups, each aligned and corresponding with one of the p groups of row or column electrodes, where the grid electrodes for controlling electrons directed towards each of the p groups are controlled by signals applied to the corresponding three terminals in the following sets of terminals: $R_1$, $G_1$, $B_1$; $R_2$, $G_2$, $B_2$; . . . . . ; $R_p$, $G_p$, $B_p$. For example, as also shown in FIG. 6, as for the subgroups of grid electrodes corresponding to the next group of pixel arrays or row or column electrodes $(n+1)$ through $(2n+1)$, again all the subgroups of grid electrodes corresponding to phosphor strips for emitting light of the same color are connected by electrical connectors to the same terminals $R_2$, $G_2$, and $B_2$. The same is true for all the remaining subgroups of the grid electrodes corresponding to the p groups of phosphor strips. Thus when a pixel array corresponding to a row or column electrode in the first of the p groups is addressed, appropriate voltages are applied sequentially to the terminals $R_1$, $G_1$, and $B_1$ to generate the desired back light for displaying a monochromatic, multi-color, or full-color image. When a pixel array corresponding to a row or column electrode in a different one of the p groups is addressed, then the terminals connected to the subgroups of grid electrodes for addressing such particular group of row or column electrodes are addressed in the same manner for supplying the appropriate back light.

The above-described system for generating electrodes employs heated filaments. Another type of system for generating electrons is known as field emission cathodes or cold cathodes, such as the Microtip structure first introduced by Spindt in the Journal of Applied Physics, Vol. 47, No. 12, p. 5248. See Technical Note 1, Oct. 1990 from the Coloray Display Corp., entitled "Field Emission Display Technology Review." A cross-sectional view of EFBL device 250 is shown in FIG. 7. As shown in FIG. 7, instead of using elongated filaments that are heated, the Microtip cold cathode structures are cone-shaped structures 252 with apex 252a which emits electrons which can then be accelerated by the voltage difference between the cathodes and the anodes and controlled by grid structures 254. The cone-shaped cathodes may be located on the conductive substrate 256 and the cone structures 252 are located within holes 260 in electrically insulating layer 262.

FIG. 8 is a perspective view of the grid electrodes 254 and the tips 252a of the cathodes, where the grid electrode for directing the electrons towards a phosphor strip for generating red light is labeled R, and so on. FIG. 9 is a cross-sectional view of an EFLCD employing the EFD 250 of FIG. 7. For simplicity, some of the layers have been omitted from FIG. 9, it being understood that the presence of such omitted layers may be desirable to improve the performance of the device. The surface of grid electrodes 254 are highly light reflective so as to reflect light towards the LCD 32 to increase efficiency of the device.

As shown in FIGS. 1 and 5, a second group of grid electrodes 88 is employed. Substantially the same voltage is applied to all the grid electrodes in the second set 88 to evenly distribute the electrons generated by cathodes 90 throughout the lateral extent of the subchamber between spacer 92 and side plate 82 This improves the uniformity of the display. It will be understood, however, that if desired, this second set 88 of grid electrodes may be omitted, particularly if the thickness of the EFD is to be reduced. In FIG. 9, however, since the second set 88' of electrodes are closer to phosphor strips 78 than electrodes 254, set 88' is used instead of set 254 for controlling the paths of electrons and to direct them only to the strips whose light emission is desired at any particular time.

FIGS. 10 and 11 illustrate an analog EFLCD where the transmission rate of the LCD therein is proportional to analog input signals. In reference to FIGS. 2, 10 and 11, display control unit 104 applies pulses 301 each composed of a reset component and a scanning component periodically, including at times $t_{n1}$, $t_{n2}$ and $t_{n3}$ as shown in FIG. 10. These reset and scanning pulses 301 are applied to LCD 32 by LCD row controllers 106 as controlled by unit 104. In response to the analog input 101, LCD column drivers 102 apply three sequential pulses $t_{Rm}$, $t_{Gm}$ and $t_{Rm}$ labeled 302 in FIG. 10. To synchronize the timing of pulses 301, 302, a synchronization signal SYNC is applied to unit 104. In response to pulses 301, 302, the transmission rate of a selected pixel addressed by pulses 301, 302 is shown as curve 304 in FIG. 10. As shown in FIG. 10, the steady transmission rate (the level of the plateau such as at a, b, c) in curve 304 is proportional to the amplitude of pulses 302. In synchronism therewith, EFBL 34 generates red, green and blue pulses of constant width and amplitude during the time period at which the transmission rate of the selected pixel is substantially constant.

LCDs are relatively slow devices. As seen in FIG. 10, the LCD requires a certain time period after the application of pulses 301, 302 before its transmission rate reaches a certain constant level. For this reason, it is desirable to cause the EFBL 34 to generate light of the appropriate color at a selected time $t_L$ after the application of pulses 301, 302 so that the back light is generated only when the transmission rate of the selected pixel has reached maximum level. This improves the efficiency of the EFLCD. In one embodiment, the electrons destined for the strips from the corresponding subgroup of grid electrodes are not directed towards the strips until the transmission rate 304 of the selected pixels reach 50%. Since $t_L$ is a constant for any LCD, any LCD 32 used can be tested to determine the time $t_L$ and the timing for application of voltages is adjusted so that the timing of pulses 303 of red, green and blue light is adjusted accordingly through unit 104. Display control unit 104 generates scanning pulses 301 in response to the synchronization signal SYNC. LCD column drivers 102 derive data pulses 302 in response to reference pulses 312 said reference pulses being synchronized with scanning pulses 301. "FIG. 11 is a schematic circuit diagram illustrating in some detail a circuit for generating pulses for operating the back light portion of an electronic fluorescent LCD." First, the reference pulse is delayed by a delay 314 by a time period Td which should be the same as $t_L$ of FIG. 10. Pulse generator 316 then generates a corresponding pulse 318 which is similar to pulse 312 in shape but delayed relative to it by the time period Td (i.e., $t_L$). Such pulse 318 is applied to AND-gates 320, 322, 324. Color selection signals R, G, B are also applied to the remaining inputs of the AND-gates so that when a particular color is desired, the corresponding AND gate is enabled. The output of the AND-gate enabled drives the corresponding one of three amplifiers 330, 332, 334. The gains of the amplifiers are controlled by a gain control signal applied to the gate of a FET 336. The outputs of the amplifiers 330, 332, 334 are pulses 302. The gain control signal is derived from input 101 by the column drivers 102 in FIG. 2 in a conventional manner so that it will not be elaborated here. It will be noted in FIG. 10 that the pulses 303 are turned off during the time period $t_F$ before the next scanning pulse. This reduces crosstalk in a manner described below.

FIGS. 12-15 illustrate another addressing and control scheme for generating various gray tones of red, green and blue to form a multi-color or full-color display in an EFLCD to illustrate another embodiment of the invention. In reference to FIGS. 2 and 13, display control unit 104 of FIG. 2 generates a fixed pattern of red, green and blue pulses 352 illustrated in FIG. 13. As shown in FIG. 13, pulses 352 are composed of a red light pulse followed by another red light pulse of twice the width which is followed by a green pulse of the same width as the first red pulse and another green pulse of twice the width as the first green pulse, where the last green pulse is followed by a blue pulse of the same width as the shorter red and green pulses and is in turn followed by a blue pulse of twice its width. This pattern then is repeated indefinitely. Display unit 104 may cause this to happen by applying appropriate voltages to the appropriate group (86, 204, 88') of grid electrodes.

However, light pulses 352 will not be visible through the LCD 32 unless the particular pixels scanned do transmit light. In FIG. 13, each scanning cycle is divided into six segments, where during each segment, the selected pixel is either completely turned off so that it is opaque to light or it is fully turned on so as to transmit light at the maximum level. Each segment corresponds in timing to one of the six pulses 352. Thus depending on whether during such segment of the scanning cycle, the pixel being scanned is rendered light transmitting or not, the corresponding light pulse 352 will either be transmitted or blocked.

In FIG. 13, during the first, third and sixth segments of the scanning cycle, the selected pixel is rendered light transmitting to transmit three light pulses (1R, 1G and 2B) to transmit light of a color of R:G:B ratio 1:1:2 (a blue-shaded gray). Thus by choosing to transmit or not transmit each one of the six pulses, a number of colors and color combinations can be generated.

Thus in FIG. 13, during the first, third and sixth segments of the scanning cycle, data stored on the LCD electrode is a "1" while during the second, fourth and fifth segments, the data stored on the LCD electrode is a "0," as illustrated by the square signal 354 in FIG. 13. Such signal is produced by column drivers 102 in response to the digitized input signal through converter 112 and memory 114, and is applied to LCD 32. The curve 356 for the transmittance of the LCD 32 in response to data 354 is also illustrated in FIG. 13. The light pulses that are transmitted through the LCD 32 is illustrated by pulses 358.

From the above illustration in reference to FIG. 13, it will be noted that each of the red, green and blue colors may be selected in four different intensities of brightness (0 to 3). In other words, the gray tones for each of the colors may be represented by two bits. In order to provide a 3 bit gray tone for each color, the EFBL color pulse light 352 should instead comprise nine pulses (1R, 2R, 4R; 1G, 2G, 4G; 1B, 2B, 4B). The scanning cycle should then be divided into nine segments instead of six. If four bit gray tones are desired, the EFBL color pulse lights 352 should comprise indefinite repetitions of twelve pulses (1R, 2R, 4R, 8R; 1G, 2G, 4G, 8G; 1B, 2B, 4B, 8B) and the scanning cycle should be divided into twelve cycles. Thus in general, the number of pulses and the number of segments in the scanning cycle are equal to three times the number of bit gray tone values desired.

FIG. 14 illustrates an alternative scheme to FIG. 13 in essentially the same addressing and control system. In FIG. 13, the gray tone values in pulses 352 are obtained by varying light pulse widths where the pulses are of constant amplitude. Instead of varying the pulse widths, the light pulse amplitudes may be varied instead as illustrated by pulses 360 in FIG. 14. Thus pulses 360 have constant widths; however, their amplitudes vary. Therefore, instead of providing pulses 352 as described above, display control unit 104, RGB scanning 110, and EFBL drivers 108 may cause EFBL 34 to emit light pulses 360 instead and the above description in reference to FIG. 13 still applies for creation of various gray tones of red, green and blue.

FIG. 12 illustrates the relative timing of the LCD scanning or reference pulses 312, the EFBL pulses 352, and the LCD transmittance 356. As in the case of an analog LCD illustrated in FIG. 10, it is desirable to delay the generation of the EFBL light pulses 352 until the time when the transmittance of the LCD 356 is at its maximum. The EFD device 34 and 250 of this application generate back lighting pulses of brightness of over about 100,000 cd/m², so that even narrow pulses whose widths are small compared to the duration of the scanning cycle produce images of adequate brightness. For this reason, the efficiency of the display can be vastly improved by providing light from the EFLCD only through a small percentage of the scanning cycle.

In FIG. 12, t' is the time at which a scanning cycle ends so that the next scanning cycle is for scanning the next row of pixels. From the shape of the curve 356, it may appear that it will be desirable to delay pulse 352a until it is almost at the end of the scanning cycle, which is just before time t' at which time the LCD transmittance is maximum. However, doing so would cause undesirable crosstalk between the pixel row presently addressed and the adjacent pixel rows which have just been addressed immediately before time t', where the color or light intensities change at time t'. This aspect is illustrated in FIGS. 16 and 17.

FIG. 16 is a schematic diagram of a subchamber 380 of EFD 34. As noted above, spacers 92 would be effective in reducing or even preventing crosstalk between light generated from phosphor strips within one subchamber and the LCD pixels corresponding to a different subchamber. The feature of the invention illustrated in FIGS. 16, 17 further reduces crosstalk between pixel rows corresponding to phosphor strips within the same subchamber. Again there are a total of M row electrodes corresponding to M pixel rows, where the M pixel rows are divided into p groups of n each within each subchamber. Subchamber 380 of FIG. 16 illustrates one of such subchambers. As shown in FIG. 16, each of the n pixel rows is represented by a square box labeled by one of the numbers: 1, 2, 3, ... i−1, i, i+1, i+2, .., n. The scanning direction is from 1 towards n.

The quantity Td (FIG. 12) is the delay between the scanning pulse for the ith row in FIG. 16 and the time at which pulse light generated by EFBL is fired to transmit light through the ith row. During one scanning field cycle beginning with the scanning pulse for the ith row, data will be fed sequentially into the i+1th row . .., nth row, row 1 ..., row i−1, where towards the end of the field cycle, row i−1 will also have been fed data to open the selected pixels in such rows. Therefore, in the extreme case illustrated in FIG. 16, where rows 1 through i−1 are holding data for color B and rows i through n are holding data for color A, if the firing of the pulse light of EFBL is delayed until the end of the field cycle, the pulse light will be transmitted through one or more of the previously addressed rows i−1, i−2, ..., where the number of rows affected depends on the viewing angle of the liquid crystal material and the spacing between the LCD layer and the phosphor layer in the EFLCD. Thus in order to reduce such crosstalk, it will be desirable for the EFBL to have finished emitting the light pulse (falling edge of light intensity) at the latest at a time $T_L$ before the end of the field cycle where $T_L$ is given by $kd.\tan\theta$, where d is the spacing between the LCD layer and the phosphor layer, $\theta$ being the viewing angle of the liquid crystal material, and k being a predetermined constant proportional to the scanning speed of the LCD in the EFLCD. Such configuration is illustrated in the schematic diagram of FIG. 16.

The above-described EFLCD device may be used in many applications. For example, it may be used for generating alphanumeric digital displays to displays numbers, language characters or letters, and graphics. It can also be used to emit different color light as a function of the amplitude of an input signal such as speed. For example, when the EFLCD is used in a speedometer, at low speed, blue light is displayed. As the speed increases, the color of light emitted by the EFLCD changes from blue to bluish green to green, and then to yellowish green and yellow. When the speed is such as to require a user or driver to be warned, the light emitted changes color to orange. When the speed is in the danger zone, the color of the light emitted by the EFLCD becomes red, which may be emitted intermittently as a flashing red light as warning to users, drivers or other observers. The above-described scheme is particularly useful at a control center with many instrument panel displays. Thus if the large number of systems controlled by the control center are functioning properly, the light emitted by the EFLCD devices used in the display panels would all display green light. If one particular system deviates from normal operation, the EFLCD in the display panel for controlling such system may be used to display orange light. If the abnormality reaches into the danger zone, the EFLCD in the display panel for such system displays red light. Thus if one of many subsystems is not functioning properly, by displaying orange or red light amongst a large number of green light displays, improper functioning of systems can be easily discovered, and measures can be taken to remedy the situation. The particular sequence desired can be easily accomplished using software control in either the analog or digital manner described above. Such implementation is believed to be easily accomplished by those skilled in the art and would not be elaborated here. It will be evident in the above-described color transitions, that not the entire sequence is necessary and that some of the colors such as blue, bluish green or yellowish green may be omitted if desired. One may simply base the choice of colors on the fact that in the traffic light convention accepted all over the world today, green usually means that it is safe to proceed, yellow being a warning signal, and that red usually means danger.

FIG. 18 is a cross-sectional view of a portion of one of many panels arranged in an array of a flat mosaic color display apparatus. Each of such panels is essentially similar in construction to the EFLCD device described above. The LCD in the above-described EFLCD device may employ zone scanning. For example, each group of grid electrodes within a subchamber confided between spacers or between the spacers and the sidewall may be independently scanned relative to other groups of grid electrodes. For this reason, the LCD employed does not need high switching speeds to display high resolution video images. As indicated above, the surface of the anode 76 facing the LCD may be made of a high reflection coefficient material, such as aluminum film.

One common problem in mosaic type displays the dark lines or areas between adjacent panels in the panel array from which the mosaic display is constructed. To reduce such dark lines or areas, the electrical conductors 402 for connecting a control system such as system 100 of FIG. 2 to panel 400 may be employed on the outside surface of the sides of the panel 400 extending towards the back plate 72 of the EFD device 34'. The side walls 404, 406 are thinner compared to those of EFLCD 30 of FIG. 1. Aside from such differences, LCD 32' and EFD 34' are essentially the same as LCD 32 and EFD 34 of FIG. 1. With such construction, the dark areas caused by the side walls 404, 406 and conductors 402 are minimized. The sidewall 404 has a thickness of less than about 5 mm. As in device 30, the sidewalls and spacers employed in EFD 34' are slanted or tapered and have diffusive reflection surfaces facing the LCD 32' so as to further reduce any dark areas between panels. With such construction, a high resolution, the efficient mosaic flat panel monochromatic, multi-color or full-color display is provided.

While the invention has been described by reference to various embodiments, it will be understood that various modifications may be made without departing from the scope of the invention which is to be limited only by the appended claims.

What is claimed is:

1. A method for image display employing an apparatus comprising:
   a front end unit including:
   (a) an array of row electrodes and an array of column electrodes transverse to the row electrodes;
   (b) a layer of liquid crystal material placed between and overlapping the two arrays at a pixel plane, wherein the row electrodes intersect the column electrodes over areas of intersection of the layer at the pixel plane to define a spatial sequence of a first through nth linear arrays of pixels, n being a positive integer, said n arrays arranged spatially consecutively in the plane from the first array to the nth array;

a back light unit adjacent to the front end unit and having an array of elongated light emitting elements arranged in a light emitting plane alongside the pixel plane so that each light emitting element is spatially aligned and corresponds to at least one array of pixels, said elements including at least elements that emit light of a first color defining first color elements, and elements that emit light of at least one additional color defining additional color elements, wherein the total thickness of the apparatus is less than 2 cm;

said method comprising:

applying electrical signals to the two arrays of electrodes to cause each of the n arrays of pixels to modulate their light transmittance and one at a time during a corresponding scanning cycle defining the scanning of each such pixel array and so that the pixel arrays are sequentially scanned from the first to the nth array to sequentially modulate their light transmittance, said applying step applying a first sequence of first color data signals to modulate the light transmittance of the pixels for displaying and controlling the brightness of images of the first color, said applying step applying at least one additional sequence of other color data signals to modulate the light transmittance of the pixels for displaying images of said at least one additional color, said at least one additional sequence of signals being applied subsequent to or preceding the application of the first sequence of signals;

during the application of the first sequence, causing each of the first color elements aligned with and corresponding to at least one pixel array to emit light at a time delay after electrical signals are applied to the electrodes during the scanning cycle for such at least one pixel array to modulate the light transmittance of the corresponding at least one array of pixels for displaying and controlling the brightness of images of the first color; and during the application of the at least one additional sequence, causing each of the additional color elements aligned with and corresponding to at least one pixel array to emit light at a time delay after electrical signals are applied to the electrodes during the scanning cycle for such at least one pixel array to modulate the light transmittance of the corresponding at least one array of pixels for displaying and controlling the brightness of images of said at least one additional color, so that different elements emitting light of the same color are caused to emit light sequentially over time and sequentially spatially across the light emitting plane;

said time delay or delays being such that each element emits light substantially at or near the end of the corresponding scanning cycle of the corresponding at least one array of pixels.

2. The method of claim 1, wherein the causing steps cause the elements to emit light pulses that are short in duration compared to the duration of the scanning cycles.

3. The method of claim 1, further comprising performing sequentially and repeatedly said applying step for applying said first sequence and said at least one additional sequence and performing sequentially and repeatedly said causing steps to cause the elements to emit sequentially light of the first color and said additional color, for a full color or multicolor display.

4. The method of claim 1, wherein said first color elements are grouped into groups of elements, and said additional color elements are grouped into groups of elements, the elements in each group being adjacent to one another and overlapping a corresponding group of array of pixels, said causing steps being such that they cause the elements in each group to emit light at the same time after electrical signals are applied to the electrodes to change the light transmittance of the arrays of pixels in the corresponding group of arrays of pixels to become light transmitting.

5. The method of claim 1, wherein said back light unit includes:

a housing defining a vacuum chamber therein, said light emitting elements being in said chamber;

an anode in the chamber, said anode overlapping entirely a plurality of arrays of pixels;

a plurality of cathodes in the chamber; and a plurality of control electrodes in the chamber, said control electrodes aligned with and corresponding to the light emitting elements, wherein said causing steps include applying electrical signals to the anode, cathodes, and control electrodes.

6. The method of claim 5, wherein at least one of the cathodes does not spatially overlap at least one of the light emitting elements, said method further comprising causing the cathodes to generate electrons, wherein said step of applying electrical signals to the anode, cathodes, and control electrodes is such that electrons generated by said at least one cathode are directed towards said at least one of the elements to cause light emission therefrom.

7. The method of claim 6, wherein said step of applying electrical signals to the anode, cathodes, and control electrodes is such that electrons generated by said cathodes are spread out laterally before they are directed towards the elements.

8. The method of claim 5, wherein said elements are phosphor strips that generate light of a first, second or third color, and wherein said set of control electrodes comprises a plurality of subsets of control electrodes, each subset being aligned with and corresponding to a phosphor strip, said causing steps comprising applying a time sequence of predetermined voltages to said subsets of control electrodes to direct electrons sequentially towards phosphor strips that generate sequentially light of a first color, light of a second color, and then light of a third color.

9. The method of claim 5, wherein each of the first or additional sequence comprises a time sequence of first color or other color LCD data pulses and other data signals wherein said causing steps include applying a time sequence of electrical pulses, each electrical pulse being applied at a first time delay after the application of and corresponds to a first color or other color LCD data pulse, wherein each electrical pulse is applied at a second predetermined time period preceding the LCD data pulse that succeeds the LCD data pulse corresponding to such electrical pulse to reduce crosstalk.

10. The method of claim 9, wherein the LCD data pulses are applied at a scanning speed, and wherein said second time period is greater than $kd(\tan\theta)$, where d is the distance between the elements in the light emitting plane and the liquid crystal layer, 0 the liquid crystal viewing angle, and k a constant inversely proportinal to the scanning speed of the LCD data pulses.

11. The method of claim 9, wherein said first predetermined time delay is such that each electrical pulse is applied when the transmission rate of the selected pixels through which light transmission is modulated exceeds about 50% of the light transmittance of such pixels upon settlement.

12. The method of claim 8, wherein said array of row or column electrodes includes M row or column electrodes divided into p groups of n rows or columns each, wherein said phosphor strips are divided into p groups each aligned and corresponding with one of the p groups of row or column electrodes, wherein the step for applying signals to the row or column electrodes and the step for applying voltages to the subsets of control electrodes are such that when such signals are applied to electrodes in a group, electrons destined for the strips of the corresponding group are not directed towards the strips until the transmission rate of the selected pixels corresponding to the selected group of row or column electrodes exceeds 50% of the light transmittance of such pixels upon settlement.

13. The method of claim 1, wherein said causing steps generate and direct sequentially red, blue and green light towards each pixel, so that when any pixel is light transmitting, red, blue or green light is permitted to pass through the entire pixel area to display multi-color or full color images.

14. An apparatus for image display comprising:
 a front end unit including:
  (a) an array of row electrodes and an array of column electrodes transverse to the row electrodes;
  (b) a layer of liquid crystal material placed between and overlapping the two arrays at a pixel plane, wherein the row electrodes intersect the column electrodes over areas of intersection of the layer at the pixel plane to define a spatial sequence of a first through nth linear arrays of pixels, n being a positive integer, said n arrays arranged spatially consecutively in the plane from the first array to the nth array;
 a flat panel back light-unit adjacent to the front end unit and defining a vacuum chamber therein and an array of elongated light emitting elements in the chamber arranged in a light emitting plane alongside the pixel plane so that each light emitting element is spatially aligned and corresponds to at least one array of pixels, said elements including at least elements that emit light of a first color defining first color elements, and elements that emit light of at least one additional color defining additional color elements, wherein the total thickness of the front end and back light units is less than 2 cm;
 a first device applying electrical signals to the two arrays of electrodes to cause each of the n arrays of pixels to modulate their light transmittance one at a time during a corresponding scanning cycle defining the scanning of each such pixel array and so that the pixel arrays are sequentially scanned from the first to the nth array to sequentially modulate their light transmittance, said first device applying a first sequence of first color data signals to modulate the light transmittance of the pixels for displaying and controlling the brightness of images of the first color, said first device applying at least one additional sequence of other color data signals to modulate the light transmittance of the pixels for displaying images of said at least one additional color, said at least one additional sequence of signals being applied subsequent to or preceding the application of the first sequence of signals;
 a second device causing each of the first color elements aligned with and corresponding to at least one pixel array to emit light at a time delay after electrical signals are applied to the electrodes during the scanning cycle for such at least one pixel array and during the application of the first sequence, to modulate the light transmittance of the corresponding at least one array of pixels for displaying and controlling the brightness of images of the first color; and
 wherein during the application of the at least one additional sequence, said second device causes each of the additional color elements aligned with and corresponding to at least one pixel array to emit light at a time delay after electrical signals are applied to the electrodes during the scanning cycle for such at least one pixel array to modulate the light transmittance of the corresponding at least one array of pixels for displaying and controlling the brightness of images of said at least one additional color, so that elements emitting light of the same color are caused to emit light sequentially over time and sequentially spatially across the light emitting plane;
 said time delay or delays being such that each element emits light at a time substantially at or near the end of the scanning cycle of the corresponding at least one array of pixels.

15. The apparatus of claim 14, wherein said back light unit includes:
 a housing defining said vacuum chamber therein, said light emitting elements being in said chamber;
 an anode in the chamber;
 a plurality of elongated cathodes in the chamber, wherein at least one of said cathodes does not spatially overlap at least one light emitting element; and
 a plurality of control electrodes in the chamber, said control electrodes aligned with and corresponding to the light emitting elements, wherein said causing steps include applying electrical signals to the anode, cathodes including said at least one cathode, and control electrodes.

16. The apparatus of claim 15, further comprising a third device causing the cathodes to generate electrons, wherein said first device applies electrical signals to the anode, cathodes including said at least one cathode, and control electrodes such that electrons generated by said at least one cathode are directed towards said at least one of the elements to cause light emission therefrom.

17. The apparatus of claim 16, wherein said first device applies electrical signals to the anode, cathodes, and control electrodes such that electrons generated by said cathodes are spread out laterally before they are directed towards the elements.

18. The apparatus of claim 15, wherein said elements are phosphor strips that generate light of a first, second or third color, and wherein said set of control electrodes comprises a plurality of subsets of control electrodes, each subset being aligned with and corresponding to a phosphor strip, said second device applying a time sequence of predetermined voltages to said subsets of control electrodes to direct electrons sequentially towards phosphor strips that generate sequentially light of a first color, light of a second color, and then light of a third color.

19. The apparatus of claim 15, wherein each of the first or additional sequence comprises a time sequence of first color or other color LCD data pulses and other data signals wherein said causing steps include applying a time sequence of electrical pulses, each electrical pulse being applied at a first time delay after the application of and corresponds to a first color or other color LCD data pulse, wherein each electrical pulse is applied at a second predetermined time period preceding the LCD data pulse that succeeds the LCD data pulse corresponding to such electrical pulse to reduce crosstalk.

20. The apparatus of claim 19, wherein the LCD data pulses are applied at a scanning speed, and wherein said second time period is greater than kd(tan$\theta$), where d is the distance between the elements in the light emitting plane and the liquid crystal layer, $\theta$ the liquid crystal viewing angle, and k a constant inversely proportinal to the scanning speed of the LCD data pulses.

21. A flat panel display apparatus comprising:
a layer of liquid crystal material;
a first device for addressing locations on said layer to cause said layer to modulate the intensity of light transmitted through said layer at selected pixel locations, said locations arranged in linear pixel arrays; and
a back light source comprising:
a plurality of cathodes disposed in a chamber;
a second device for causing the cathodes to emit electrons;
an anode in the chamber overlapping entirely a plurality of the arrays of pixels;
at least a first and a second set of control electrodes in the chamber substantially parallel to the layer, said two sets of control electrodes being on different planes between the anode and cathodes;
elements disposed in the chamber at or near the anode and responsive to said electrons for generating and directing light towards the layer of liquid crystal material, said elements arranged in arrays aligned with and corresponding to the linear pixel arrays, at least one of said cathodes not overlapping or aligned with any element; and
a third device for applying electrical signals to the anode, cathodes and control electrodes, causing the electrons emitted by the cathodes to travel towards the anode, and electrons emitted by said at least one cathode to travel toward an element;
wherein the electrical signals applied to the first or the second set of control electrodes are such that electrons emitted by the cathodes are caused to spread out laterally in the chamber and the cathodes and control electrodes and the electrical signals are such that electrons from different cathodes are directed towards a selected element to cause light emitted by the selected element to be directed to the corresponding pixel array to generate images.

22. The apparatus of claim 21, said elements generating and directing sequentially red, blue and green light towards each pixel, so that when any pixel is light transmitting, red, blue or green light is permitted to pass through the entire pixel area to display multi-color or full color images.

23. The apparatus of claim 21, wherein said elements comprises phosphor strips that emit light in one of three colors, said colors including red, blue and green, towards the anode in response to electrons, said strips being substantially parallel to the contol electrodes.

24. The apparatus of claim 23, wherein said set of control electrodes comprises a plurality of subsets of grid electrodes, each subset overlapping and corresponding to a phosphor strip, said third device applying a time sequence of predetermined voltages to said subsets of grid electrodes to direct electrons sequentially towards phosphor strips that generate sequentially light of a first color, light of a second color, and then light of a third color.

25. The apparatus of claim 23, said strips being arranged in an array where strips for emitting light of the three colors alternate periodically.

26. The apparatus of claim 21, wherein said back light source includes a housing comprising a face plate facing the liquid crystal layer and a back plate, said two plates defining between them the chamber, said housing further comprising a plurality of elongated spacers between the two plates dividing the chamber into a number of subchambers.

27. The apparatus of claim 26, wherein said spacers extend between the two plates to support the plates against atmospheric pressure, said spacers being wedge-shaped with thicker and thinner sides, their thinner sides being attached to the face plate to reduce any dark areas caused thereby.

28. The apparatus of claim 26, said spacers having diffusive light reflecting surfaces.

29. The apparatus of claim 21, said first device comprising an array of row electrodes and an array of column electrodes transverse to the row electrodes, said layer of liquid crystal material placed between and overlapping the two arrays at a pixel plane, wherein the row electrodes intersect the column electrodes over areas of intersection of the layer at the pixel plane to define a spatial sequence of a first through nth linear arrays of pixels, n being a positive integer, said n arrays arranged spatially consecutively in the plane from the first array to the nth array;

said first or second set of control electrodes divided into groups of control electrodes with each group corresponding to and aligned with a group of elements, wherein during at least one cycle of a scanning operation:

said first device applying scanning pulses to a selected electrode in the row or column electrode array and LC data pulses to the electrodes in the remaining electrode array to select pixels of the pixel array corresponding to said one selected electrode, through which transmission of light is modulated, and said third device applying electrical data potential pulses to the group of control electrodes corresponding to and aligned with said selected electrode for sequentially emitting light of one or more colors through said selected pixels in the pixel row, said electrical data potential pulses being of predetermined time relationship with the scanning pulses for displaying monochromatic, multi-color or full color data in said pixel row.

30. The apparatus of claim 29, wherein selected pixels corresponding to the selected electrode during said at least one cycle are not in the nth array, and wherein during the next cycle of the scanning operation, said first device applies additional LCD scanning pulses to the selected electrode adjacent to the electrode scanned in the previous cycle and LCD data pulses to the remaining electrode array to select pixels of the corresponding next pixel array through which transmission of light is permitted, and said third device applies data potential pulses to the group of control electrodes corresponding to and aligned with said next row electrode for sequentially emitting light of one or more colors through said selected pixels in the next pixel array, said data potential pulses being of predetermined time relationship with the additional scanning pulses for displaying monochromatic, multicolor or full color data in said next pixel array.

31. The apparatus of claim 30, wherein the third device applies each data potential pulse at a first predetermined time delay after the previous scanning LCD pulse and at a second predetermined time period preceding the next LCD scanning pulse to reduce crosstalk.

32. The apparatus of claim 31, wherein said second time period is greater than kd(tan0), where d is the distance between the phosphor strips and the liquid crystal layer, 0 the liquid crystal viewing angle, and k a constant inversely proportinal to the scanning speed.

33. The apparatus of claim 31, wherein said first predetermined time delay is such that the transmission rate of the selected pixels through which light transmission is permitted exceeds about 50% of the transmission rate at settlement when each data potential pulse is applied.

34. The apparatus of claim 29, said elements including phosphor strips, wherein one of said arrays includes M row or column electrodes divided into p groups of n rows or columns each, wherein said phosphor strips are divided into p groups each aligned and corresponding with one of the p groups of row or column electrodes, wherein the third device is such that when the voltages are applied to electrodes in a group, electrons destined for the strips of the corresponding group are not directed towards the strips until the transmission rate of the selected pixels corresponding to the selected group of row or column electrodes reach 50% of the transmission rate upon settlement.

35. The apparatus of claim 21, wherein said second device includes means for heating the cathodes.

36. The apparatus of claim 35, wherein said cathodes include an array of elongated oxide coated filaments arranged substantially parallel to one another.

37. The apparatus of claim 21, said cathodes comprising cone-shaped field electron emitting structures, one of said sets of control electrodes including at least one set of grid electrodes substantially parallel to said row or column electrodes, wherein said grid electrodes define holes therein, said cone-shaped cathodes being located in said holes with their tips exposed for emitting electrons.

38. The apparatus of claim 21, said anode being located between the cathodes and the liquid crystal layer, said anode being substantially transparent, wherein said control electrodes have light reflecting surfaces facing the layer for reflecting light towards the layer.

39. The apparatus of claim 21, said cathodes being located between the anode and the liquid crystal layer, said anode having a light reflecting surface facing the layer for reflecting light towards the layer.

40. The apparatus of claim 21, back light source including a housing having a face plate adjacent to the liquid crystal layer so that light emitted by the elements passes through said face plate before it travels to the layer, said face plate having an internal surface in the chamber and an external surface outside the chamber, wherein the internal or external surface or both surfaces are light diffusive to evenly distribute light transmitted from the back lighting source to the layer.

* * * * *